(12) United States Patent
Doyle

(10) Patent No.: US 8,271,399 B2
(45) Date of Patent: Sep. 18, 2012

(54) SORTING OPTIMIZATION OF DOCUMENTS FOR MAILING

(75) Inventor: Brian P. Doyle, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/038,810

(22) Filed: Feb. 27, 2008

(65) Prior Publication Data

US 2009/0216585 A1    Aug. 27, 2009

(51) Int. Cl.
- G06Q 10/00 (2012.01)
- G06F 17/00 (2006.01)
- G06F 9/00 (2006.01)
- G07B 17/02 (2006.01)

(52) U.S. Cl. ........ 705/342; 705/408; 705/410; 705/7.11

(58) Field of Classification Search ............... 705/7, 407, 705/342, 408

See application file for complete search history.

(56) References Cited

U.S. PATENT DOCUMENTS

| | | | |
|---|---|---|---|
| 5,667,078 A | 9/1997 | Walach | |
| 6,557,755 B1 * | 5/2003 | Pickering et al. | 235/376 |
| 6,566,620 B1 | 5/2003 | Lohmann | |
| 6,813,541 B2 | 11/2004 | Schlegel | |
| 7,084,365 B2 | 8/2006 | Whitnable | |
| 2006/0139678 A1 | 6/2006 | Klopsch et al. | |
| 2007/0017855 A1 | 1/2007 | Pippin | |
| 2007/0043580 A1 * | 2/2007 | Miller et al. | 705/1 |
| 2008/0000817 A1 * | 1/2008 | Kostyniuk et al. | 209/584 |
| 2009/0159508 A1 * | 6/2009 | Kostyniuk et al. | 209/584 |

OTHER PUBLICATIONS

"Rules of the Postal Game" Chilson, John; The Magazine for Magazine Management. v26 No. 1, pp. 66-67; Jan. 1, 1997. from Dialog.*

* cited by examiner

*Primary Examiner* — John Hayes
*Assistant Examiner* — David J Clark
(74) *Attorney, Agent, or Firm* — Dan Shifrin

(57) ABSTRACT

A method of optimizing mail sorting on a envelope sorting machine by eliminating the necessity to pass some of the documents through the machine twice is provided in which a postal code table is created having an order for each of a plurality of postal code ranges. An unsorted document print stream is received and a document parameter table created to store boundaries of each of a plurality of documents and a location of a postal code in each document. An index table is constructed incorporating information from the postal code table indicating the location and order of each document in the unsorted document print stream. The index table is reordered according to the order of each document and a sorted document print stream is generated, whereby the documents are arranged in order of their respective priorities. The documents are then printed from the sorted document print stream, separated into groups in accordance with their respective priorities and sorted in order of each group's respective order.

19 Claims, 3 Drawing Sheets

SORTING OPTIMIZATION OF DOCUMENTS FOR MAILING

TECHNICAL FIELD

The present invention relates generally to mail sorting and, in particular, to efficient sorting of mail to obtain maximum postage discounts.

BACKGROUND ART

Numerous businesses and other organizations mail large quantities of mail, such as bills, statements and computer-generated letters, and "pre-sort" the mail in mail sorters. In the United States, for example, in order to obtain a discounted rate for first class mail, mailers must ensure that the mail meets a set of requirements for "automation mail." Foremost among these is that the mail must be presented to the U.S. Post Office (USPS) in trays that are "sorted." Each tray must contain a minimum number of envelopes in one of the following categories: (1) all envelopes will be mailed to the same 5-digit ZIP-code; (2) all envelopes will be mailed to the same 3-digit ZIP code (that is, the first three digits of the ZIP code are the same); (3) all envelopes will be mailed to the same Automated Area Distribution Center (AADC) (which is a grouping of several ZIP codes determined by the USPS); or (4) all envelopes will be mailed to the same Mixed AADC (which is a grouping of AADCs designated by the USPS). Each of these categories receives a different discount, currently ranging from $0.098 for category (1) to $0.05 for category (4). In some other countries, similar sortation requirements exist, although the details vary.

For large volume mailers who might mail from 100,000 to over 5,000,000 envelopes a day, financial reasons dictate taking steps to obtain these discounts by sorting and otherwise qualifying the mail to be automation mail.

SUMMARY OF THE INVENTION

The present invention provides a method of optimizing mail sorting on an envelope sorting machine by eliminating the necessity to pass some of the envelopes through the machine twice. The method comprises creating a postal code table comprising an order for each of a plurality of postal code ranges, receiving an unsorted document print stream and creating a document parameter table comprising information for determining boundaries of each of a plurality of documents in the unsorted print stream to be printed and for determining a location of a postal code in each document. In response to the unsorted document print stream and the document parameter table, an index table is constructed incorporating information from the postal code table, the index table indicating the location of each document in the unsorted document print stream and its order. The index table is reordered according to the order of each document in the unsorted document print stream and a sorted document print stream is generated in accordance with the reordered index table, whereby the documents are arranged in the sorted document print stream in order of their respective priorities. The documents are then printed from the sorted document print stream, separated into groups in accordance with the respective priorities of the printed documents and sorted in order of each group's respective order.

The present invention also provides a mail sorting system which comprises a postal code table indicating an order for each of a plurality of postal code ranges, a document parameter table comprising information for determining boundaries of each of a plurality of documents to be printed and for determining a location of a postal code in each document, a data source generating an unsorted document print stream and an index table incorporating information from the postal code table, the index table indicating the location of each document in the unsorted document print stream and its order. The system also comprises a reordered index table wherein the contents are arranged according to the order of each document in the unsorted document print stream and a print stream module to generate a sorted document print stream in accordance with the reordered index table, whereby the documents are arranged in the sorted document print stream in order of their respective priorities, after which the documents are printed and separated into groups in accordance with their respective priorities with the documents in each group subsequently sorted in order of the respective order of each document in the group.

The present invention further includes computer program product of a computer readable medium usable with a programmable computer and having computer-readable code embodied therein for optimizing mail sorting, and a method for deploying computing infrastructure, comprising integrating computer readable code into a computing system, wherein the code, in combination with the computing system, is capable of optimizing mail sorting.

DETAILED DESCRIPTION OF THE PREFERRED EMBODIMENT

Figure 1:
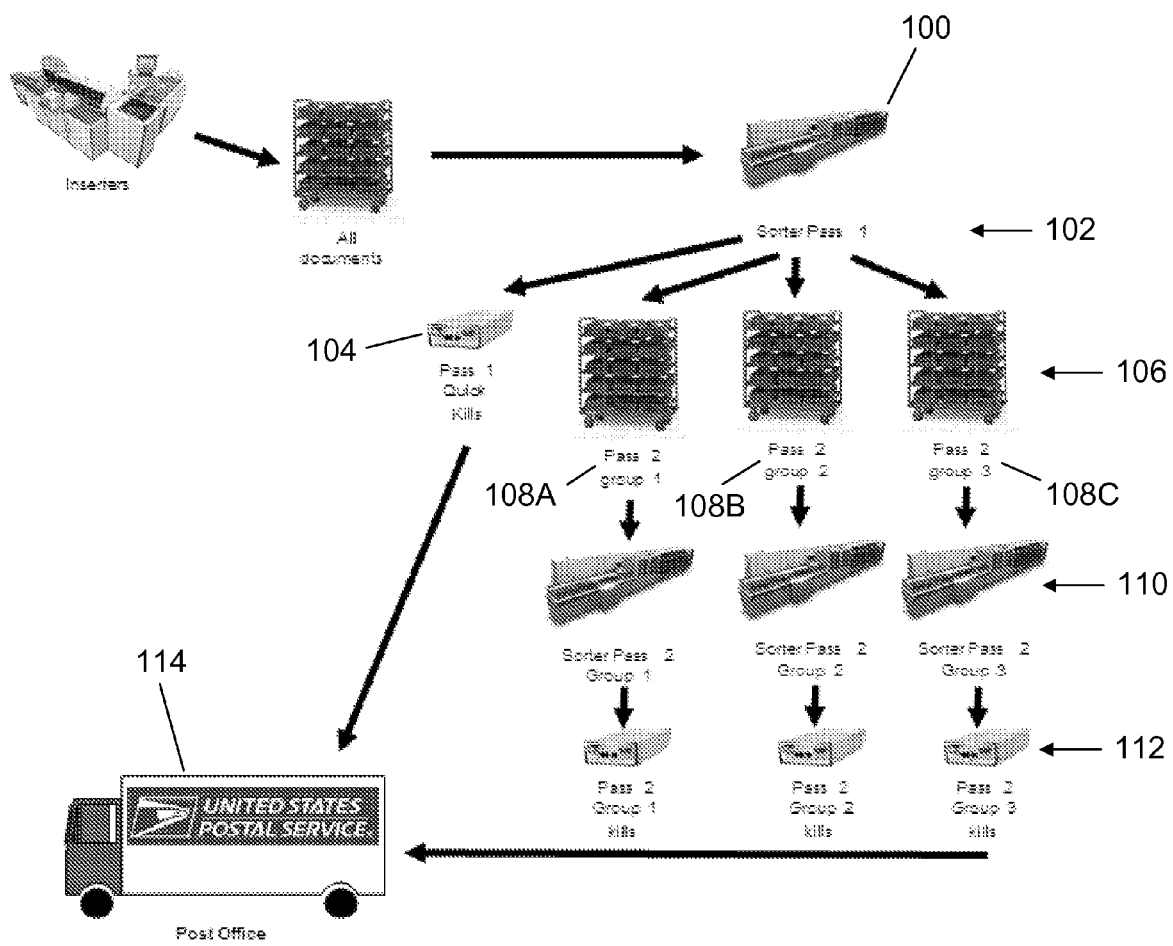
FIG. 1 illustrates a conventional sorting system and method.

Some of the functional units described in this specification have been labeled as modules in order to more particularly emphasize their implementation independence. Modules may be implemented in hardware or implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices. Furthermore, the described features, structures or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials or operations are not shown or described in detail to avoid obscuring aspects of the invention.

The order of steps in the diagrams and descriptions that follow are indicative of one embodiment of the presented process. Other steps and processes may be conceived that are equivalent in function, logic or effect to one or more steps, or portions thereof, of the illustrated process. Additionally, the format and symbols employed in the figures are provided only to explain the logical steps of the process and are understood not to limit the scope of the process. Additionally, the order in which a particular process occurs may or may not strictly adhere to the order of the corresponding steps shown.

One way to sort mail into the discount categories is to sort the originating print stream such that the documents to be mailed print grouped by the categories. The industry term for this is "electronic sortation" and it is the preferred method when it is feasible. However, many mailers receive the print streams in many relatively small increments throughout the day; the documents often print onto many different preprinted forms; and different print streams might include different enclosures. Thus, the mailers may not be able to sort the mail electronically because a given print stream will not have the "density" required to produce the high discounts.

When the mailer is not able to sort the mail electronically, which is the case for the majority of mail, the mailer will utilize a machine called an envelope or mail "sorter." These machines can "commingle" all of the mail that the mailer produces, regardless of the print stream, type of preprinted form or type of enclosure, thus obtaining the density required for high discount rates. In operation, the operator sets up a "sort scheme" in a table based on prior experience with the mail (that is, knowledge of historical volumes by postal code). The scheme is optimized to create as many high-discount trays as possible for the typical postal code volumes. A sorter feeds envelopes at a high rate, and either reads the postal code from the address on each envelope or reads a barcode on the envelope that contains the postal code and performs a table lookup on an internal table. The envelopes are then sorted into "pockets," with most of the pockets on the machine designated for one of the four categories described above for the US or into similar groupings in other countries. Operators take the envelopes from the pockets when full and place them into trays. When a tray is full, the contents may be mailed at the applicable discount rate (provided certain other requirements for labeling and postage payment are met). When multiple trays are filled, the last tray need not be full. One such mail sorter is the Pitney Bowes Olympus II Sorter which is capable of sorting up to 36,000 pieces of mail per hour. In a single-tier configuration, it can accommodate up to 160 pockets; in a multi-tier configuration, it can accommodate up to 480 pockets. It is not necessary that each pocket receive mail for a different postal code or range of codes. If the volume of mail being sent to a particular postal code is sufficiently great, mail for that postal code may be directed to more than one pocket. A single multi-tray Olympus II sorter can process mail to at most 460 postal codes or ranges of codes in one pass.

As will be appreciated, envelope sorters are very expensive to buy and operate, requiring as many as four operators, often for two or three shifts per day. The cost of both buying and operating increases as the number of the pockets increases. Mailers cannot generally afford to have enough pockets on the machines to obtain the highest discount rates with one sortation pass—for economic reasons, sorters typically have 150 to 300 trays. Thus, as illustrated in FIG. 1, it is common practice to pass a percentage of the envelopes through the sorter machine 100 twice, referred to as making two "passes." During the first pass 102, the sorter scheme table will cause the sorter to "quick kill" mail directed to certain postal codes that have a high quantity of high-discount mail and sort such mail into a number of predetermined pockets 104. However, the mail for the remaining postal codes will be sorted into the other pockets 106 and go to pass 2. Pass 2 envelopes are typically further divided into several (perhaps three or four) sub-schemes, often called "groups," three of which 108A, 108B, 108C are shown in FIG. 1, each group being sorted by the sorter 100 into a different pocket during a series of pass 2 sorts 110. After all of the envelopes have passed through pass 1 (or when a mailing deadline is reached), the operator instructs the sorter 100 to use one of the pass 2 groups (such as group 1 108A) and feeds the envelopes for that group into the sorter 100. When the pass 2, group 1 108A mail has been sorted, the operator instructs the sorter to change schemes to the next group 108B. The process continues until the mail in all of the groups has been sorted into trays 112. The trays may then be taken to be mailed 114.

Unfortunately, it is necessary to pass a portion, even a large portion, of the documents through the sorting machine 100 twice in order to achieve a reasonable level of automation discount rates. In a typical installation for example, 30% to 40% of the envelopes may pass through the machine 100 twice, increasing the labor and decreasing the amount of time available to meet deadlines.

Furthermore, as noted above, when a print/mail operation is large enough to have a sorter (typically at least ½ million envelopes/day), documents to print and mail are received from many different applications, printed on different paper and with different enclosures. In theory, a company could modify all of its many applications by adding custom code to perform optimized sortation using a general purpose data manipulation tool. However, much of the potential savings in postage would go toward the modification of the programs and it might take years to fully implement such a solution.

Figure 2:
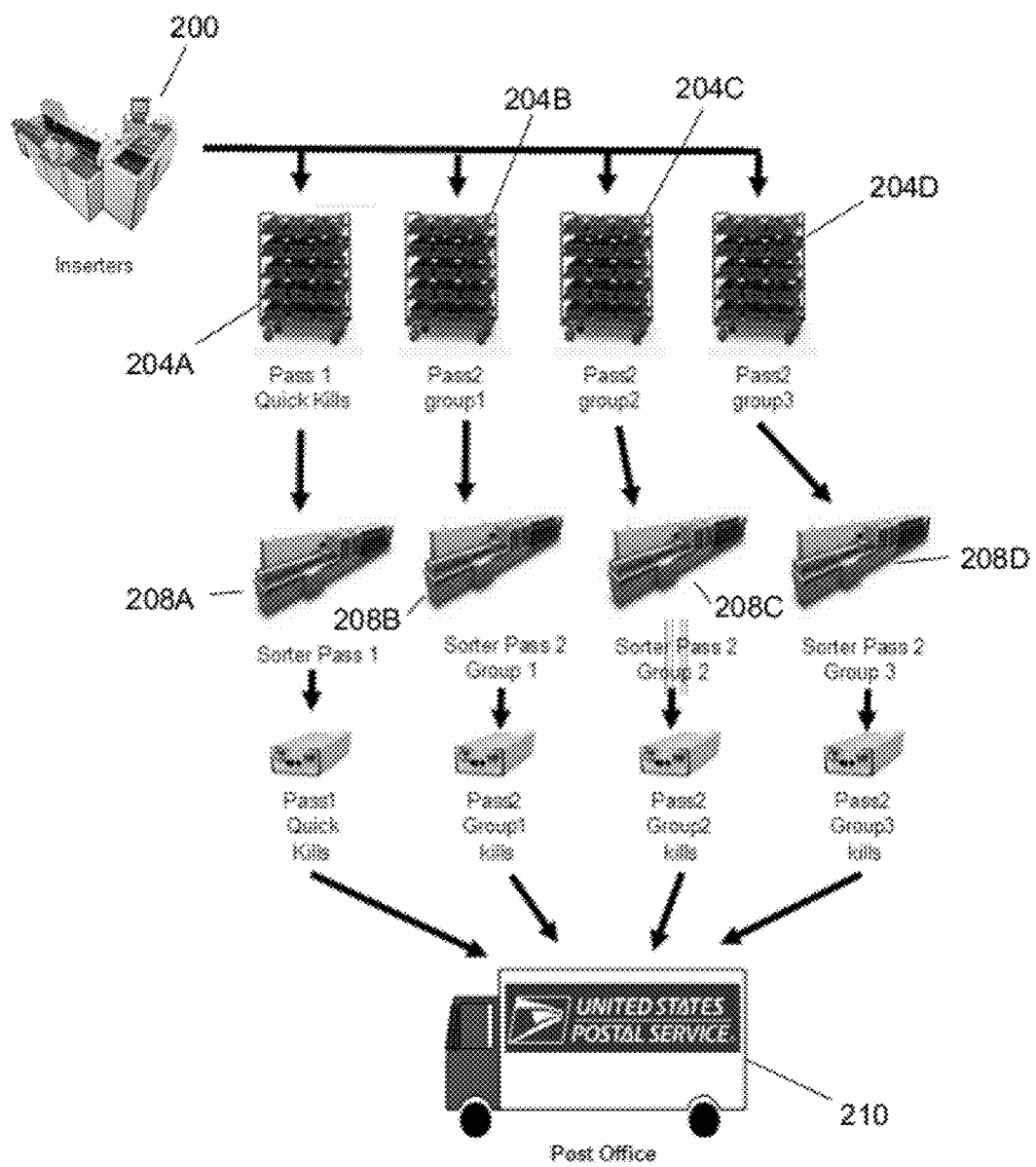
FIG. 2 illustrates an overview of the sorting system of the present invention.

Briefly, as illustrated in FIG. 2, the present invention enables a mailer to print documents from different print streams ordered according to pass number and group number. As each set of documents is printed and inserted by an inserter machine 200 into envelopes, the operator marks bins or trays 204 (four of which are shown in FIG. 2) as to content (pass 1, pass 2 group 1, etc.). The pass 1 trays 204A go immediately to the sorter(s) 100 while the pass 2 trays 204B, 204C, 204D go to a holding area where they wait for pass 1 208A to complete. Additionally, some mailers may have more than one sorter and set up schemes on the sorters to handle different sets of postal codes, usually according to ranges of postal codes. Such schemes can increase the amount of high-discount mail. In this case, the mailer currently might sort each print stream by postal code and manually segregate the streams according to the postal code ranges, directing each tray to the appropriate sorter. The present invention may further organize each print stream by sorter, by pass and group for each sorter. After pass 1 208A has been completed, the envelopes in the pass 2, group 1 tray 208B are sorted. The process continues until all of the remaining groups 208C, 208D have been sorted; the trays may then be taken to be mailed 210.

Figure 3:
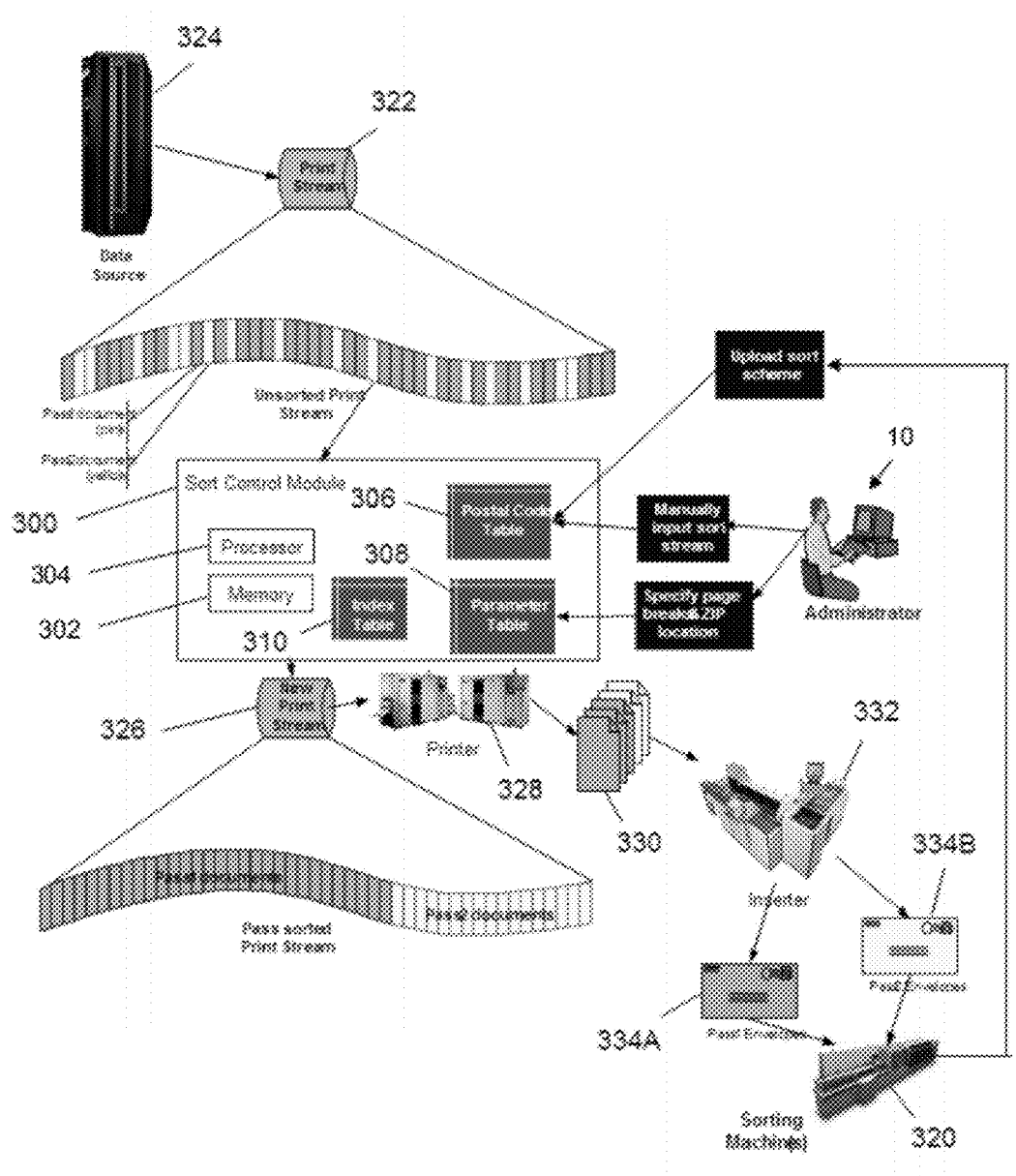
FIG. 3 illustrates the process of the sorting system of the present invention.

More specifically, and with reference to FIG. 3, a sort control module 300 includes storage, such as a memory 302, for storing instructions and data, and a processor 304 for executing the instructions stored in the memory 302. The sort control module 300 also includes a postal code table 306. Each row of the table 306 has a field for a starting postal code and an ending postal code, representing a range to which the row applies, a sorter number, a pass number and a group number. In the U.S., a postal code range may be a single 5-digit zip code, a range encompassing all of the zip codes having the same first 3-digits, a single AADC or a mixed AADC. It will be appreciated that, where other types of postal codes are used, such as in other countries, the ranges in the table 306 will represent appropriate postal codes.

Instead of separate fields in the postal code table 306 for the starting and ending postal codes of the range, a single field may be used to designate the range. The sorter number indicates which sorter is to be used for documents being sent to addresses within the postal code range. If only a single sorter is being used, the sorter number field may be eliminated, may be left blank or may be filled with a '1.' The pass number indicates the pass (generally pass 1 or pass 2) in which the documents within the range are to be "killed." And, the group number indicates, for pass 2 documents, the group in which the remaining documents in the range fall. Because the present invention does not rely on the conventional pass concept, the fields for the pass and group numbers may be replaced by a single field, such as for a scheme or group number. It will be appreciated that other table configurations or field names may be used in keeping with the scope of the present invention.

An administrator 10 may enter information into the table 306 manually. Alternatively, if the control software of the sorters(s) 320 provides the capability to output the information that it uses to perform the sorting (the sort schemes and sub-schemes) to machine-readable media, then that information can be downloaded from the sorter(s) 320 to the sort control module and uploaded into the postal code table 306 to automate the process that the administrator 10 would otherwise perform.

An unsorted print stream 322 is received from a data source 324 in a page description language (PDL). While various PDLs exist, a language used with the sort control module 300 of the present invention should have a format in which printer page images can be reordered, for example, AFP, PDF and PCL, among others. The Sort Control Module 300 creates the parameter table 308 with a set of entries for each document to be printed indicating a document's boundaries and the location of the postal code within the document. For example, a document's boundaries may be indicated by the relative byte location in the print stream at which documents begin.

The postal code table 306 and parameter table 308 may be stored in the memory 302.

After the postal code table 306 and parameter table 308 have been created and populated, the sort control module 300 "scans" the print stream 322 and, referring to the parameter and postal code tables 306, 308, constructs an index table 310 with entries for the start position of each document, its length and the sorter and scheme to which the document will be directed. The index table entries are then ordered according to sorter and scheme numbers. (As noted above, instead of being a single number, the scheme number may include separate pass and group numbers.) In response to the contents of the reordered index table 310, the sort control module 300 sends the documents as a sorted print stream 326 to an output file.

Preferably, the sort control module 300 will add a separator indicator for each document as the sort control module 300 generates the sorted print stream 326. One such separator indicator may be a printable code that appears in the document envelope window to indicate the sorter, pass and group for the document. For example, the code 321 might indicate sorter 3, pass 2, group 1. Another separator indicator may be a modified barcode that appears on each page of the document to cause the inserter machine 332 to edge mark the first few documents in a sorter, pass and group, to offset-jog them in the output stacker on the machine 332, or to otherwise indicate "breaks" to the operator so the operator can start a new tray at each break.

The sorted print stream 326 is sent to a printer 328 which prints the documents 330 in the order determined in the index table 310. The inserter machine 332 inserts printed documents 330 into envelopes 334A, 334B which are separated into bins by sorter and scheme (or pass and group) numbers.

The documents in the first bin for a sorter 320, as indicated by the scheme number (or pass and group numbers) of the documents, are fed into the sorter 320 to be sorted into pockets and ultimately deposited into trays to be presented to the post office.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for optimizing mail sorting or a method for deploying computing infrastructure comprising integrating computer readable code into a computing system for optimizing mail sorting.

What is claimed is:

1. A method of optimizing mail sorting, comprising:
   creating a postal code table in a sort control module, the postal code table comprising a sort scheme for each of a plurality of postal code ranges, the sort scheme including a pass number indicating during which of two passes documents within each postal code range will be passed through an envelope sorter;
   receiving an unsorted document print stream from a data source;
   creating a document parameter table in the sort control module, the parameter table comprising information for determining boundaries of each of a plurality of documents in the unsorted print stream to be printed and for determining a location of a postal code in each document;
   scanning the unsorted document print stream in the sort control module;
   in response to the scanned unsorted document print stream and the document parameter table, constructing an index table in the sort control module incorporating information from the postal code table, the index table indicating the location of each document in the unsorted document print stream and its scheme;
   reordering the index table in the sort control module according to the scheme of each document in the unsorted document print stream;
   generating a sorted document print stream as an output file in the sort control module in accordance with the reordered index table, whereby the documents are arranged in the sorted document print stream in order of their respective priorities;
   printing the documents in a printer from the sorted document print stream in the order determined in the index table and sending the printed documents to an inserter machine to be inserted into envelopes;

separating the printed documents into either a pass 1 bin for documents having a sort scheme with a first pass number or a pass 2 bin for documents having a sort scheme with a second pass number;

feeding the documents of the pass 1 bin into a sorting machine to sort the documents for deposit into first mailing trays to be presented to the post office; and upon completion of the sorting of the pass 1 bin, feeding the documents of the pass 2 bin into a sorting machine to sort the documents for deposit into second mailing trays to be presented to the post office.

2. The method of claim 1, wherein creating a postal code table comprises generating a sorter number for each of the plurality of postal code ranges.

3. The method of claim 2, wherein constructing the index table comprises:

extracting a postal code from each document in the unsorted document print stream;

in response to the extracted postal code, obtaining the corresponding sorter number and scheme number from the postal code table; and storing in the index table the location of each document and the corresponding sorter number and scheme number for each document.

4. The method of claim 2, wherein the scheme further includes a group number.

5. The method of claim 4, further comprising adding a separator to at least a first document in each group before printing the documents from the sorted document stream.

6. A mail sorting system, comprising:

a postal code table indicating a sort scheme for each of a plurality of postal code ranges, the sort scheme including a pass number indicating during which of two passes documents within each postal code range will be passed through an envelope sorter;

a document parameter table comprising information for determining boundaries of each of a plurality of documents to be printed within an unsorted print stream received from a data source and for determining a location of a postal code in each document;

an index table incorporating information from the postal code table in response to scanning the unsorted document print stream, the index table having entries indicating the location of each document in the unsorted document print stream and its scheme;

a reordered index table wherein the entries in the index table are ordered according to the scheme of each document in the unsorted document print stream;

a print stream module to generate a sorted document print stream as an output file in accordance with the reordered index table, whereby the documents are arranged in the sorted document print stream in order of their respective sort schemes, after which the documents are printed and separated into either a pass 1 bin for documents having a sort scheme with a first pass number or a pass 2 bin for documents having a sort scheme with a second pass number; and a sorting machine to sort the documents in the pass 1 bin for deposit into first mailing trays to be presented to the post office and, upon completion of the sorting of the pass 1 bin, to sort the documents in the pass 2 bin for deposit into second mailing trays to be presented to the post office.

7. The system of claim 6, wherein the postal code table comprises a sorter number for each of the plurality of postal code ranges.

8. The system of claim 7, wherein the index table comprises the location of each document in the unsorted document print stream and a corresponding sorter number and scheme number for the document.

9. The system of claim 6, wherein the scheme further includes a group number.

10. A computer program product of a non-transitory computer readable medium usable with a programmable computer, the computer program product having computer-readable code embodied therein for optimizing mail sorting, the computer-readable code comprising instructions for:

creating a postal code table in a sort control module, the postal code table comprising a sort scheme for each of a plurality of postal code ranges, the sort scheme including a pass number indicating during which of two passes documents within each postal code range will be passed through an envelope sorter;

receiving an unsorted document print stream from a data source;

creating a document parameter table in the sort control module, the parameter table comprising information for determining boundaries of each of a plurality of documents in the unsorted print stream to be printed and for determining a location of a postal code in each document;

scanning the unsorted document print stream in the sort control module;

in response to the scanned unsorted document print stream and the document parameter table, constructing an index table in the sort control module incorporating information from the postal code table, the index table indicating the location of each document in the unsorted document print stream and its scheme;

reordering the index table in the sort control module according to the scheme of each document in the unsorted document print stream;

generating a sorted document print stream as an output file in the sort control module in accordance with the reordered index table, whereby the documents are arranged in the sorted document print stream in order of their respective priorities;

printing the documents in a printer from the sorted document print stream in the order determined in the index table and sending the printed documents to an inserter machine to be inserted into envelopes;

separating the printed documents into either a pass 1 bin for documents having a sort scheme with a first pass number or a pass 2 bin for documents having a sort scheme with a second pass number;

feeding the documents of the pass 1 bin into a sorting machine to sort the documents for deposit into first mailing trays to be presented to the post office; and upon completion of the sorting of the pass 1 bin, feeding the documents of the pass 2 bin into a sorting machine to sort the documents for deposit into second mailing trays to be presented to the post office.

11. The computer program product of claim 10, wherein the instructions for creating a postal code table comprise instructions for generating a sorter number for each of the plurality of postal code ranges.

12. The computer program product of claim 11, wherein the instructions for constructing the index table comprise instructions for:

extracting a postal code from each document in the unsorted document print stream;

in response to the extracted postal code, obtaining the corresponding sorter number and scheme number from the postal code table; and storing in the index table the location of each document and the corresponding sorter number and scheme number for each document.

13. The computer program product of claim 11, wherein the scheme further includes a group number.

14. The computer program product of claim 13, further comprising instructions for adding a separator to at least a first document in each group before printing the documents from the sorted document stream.

15. A method for deploying computing infrastructure, comprising integrating computer readable code into a computing system, wherein the code, in combination with the computing system, is capable of performing the following:

creating a postal code table in a sort control module, the postal code table comprising a sort scheme for each of a plurality of postal code ranges, the sort scheme including a pass number indicating during which of two passes documents within each postal code range will be passed through an envelope sorter;

receiving an unsorted document print stream from a data source;

creating a document parameter table in the sort control module, the parameter table comprising information for determining boundaries of each of a plurality of documents in the unsorted print stream to be printed and for determining a location of a postal code in each document;

scanning the unsorted document print stream in the sort control module;

in response to the scanned unsorted document print stream and the document parameter table, constructing an index table in the sort control module incorporating information from the postal code table, the index table indicating the location of each document in the unsorted document print stream and its scheme;

reordering the index table in the sort control module according to the scheme of each document in the unsorted document print stream;

generating a sorted document print stream as an output file in the sort control module in accordance with the reordered index table, whereby the documents are arranged in the sorted document print stream in order of their respective priorities;

printing the documents in a printer from the sorted document print stream in the order determined in the index table and sending the printed documents to an inserter machine to be inserted into envelopes;

separating the printed documents into either a pass 1 bin for documents having a sort scheme with a first pass number or a pass 2 bin for documents having a sort scheme with a second pass number;

feeding the documents of the pass 1 bin into a sorting machine to sort the documents for deposit into first mailing trays to be presented to the post office; and upon completion of the sorting of the pass 1 bin, feeding the documents of the pass 2 bin into a sorting machine to sort the documents for deposit into second mailing trays to be presented to the post office.

16. The method of claim 15, wherein creating a postal code table comprises generating a sorter number for each of the plurality of postal code ranges.

17. The method of claim 16, wherein constructing the index table comprises:

extracting a postal code from each document in unsorted document print stream;

in response to the extracted postal code, obtaining the corresponding sorter number and scheme number from the postal code table; and storing in the index table the location of each document and the corresponding sorter number and scheme number for each document.

18. The method of claim 16, wherein the scheme further includes a group number.

19. The method of claim 18, further comprising adding a separator to at least a first document in each group before printing the documents from the sorted document stream.

\* \* \* \* \*